United States Patent [19]
Mason

[11] Patent Number: 6,126,737
[45] Date of Patent: Oct. 3, 2000

[54] HIGH SOLIDS WATER-BASED CERAMIC PAINT

[75] Inventor: Claude Franklin Mason, Ypsilanti, Mich.

[73] Assignee: Visteon Global Technologies, Inc., Dearborn, Mich.

[21] Appl. No.: 09/220,027

[22] Filed: Dec. 23, 1998

[51] Int. Cl.[7] ............................. B28B 7/36; B32B 9/00; B32B 17/06

[52] U.S. Cl. .................... 106/600; 106/38.3; 106/38.9; 106/635; 106/636; 106/425; 106/431; 428/357; 428/426; 428/428; 428/432; 428/913

[58] Field of Search ................................ 106/600, 635, 106/636, 38.3, 38.9, 425, 431; 428/425.6, 425.9, 428, 403, 404, 432, 426, 427, 357, 372.2, 374.2, 913, 446, 703

[56] References Cited

U.S. PATENT DOCUMENTS

| | | | |
|---|---|---|---|
| 5,518,535 | 5/1996 | Boaz | 106/600 |
| 5,677,064 | 10/1997 | Boaz | 106/600 |
| 5,698,025 | 12/1997 | Boaz | 106/600 |
| 5,698,026 | 12/1997 | Boaz . | |
| 5,702,520 | 12/1997 | Boaz | 106/600 |
| 5,938,834 | 8/1999 | Boaz | 106/600 |

*Primary Examiner*—Michael Marcheschi
*Attorney, Agent, or Firm*—Charles H. Ellerbrock

[57] ABSTRACT

The invention is directed to a dark colored high-solids water-based paint composition comprising sodium silicate, water, water-soluble base, metal oxide pigment, a low-melting glass frit, and optionally, soda-lime-silica glass particles and/or zinc oxide. It may further optionally include surfactants and aluminum hydroxide. The paint composition is particularly useful as a black-out paint on automotive glazings.

13 Claims, No Drawings

HIGH SOLIDS WATER-BASED CERAMIC PAINT

FIELD OF THE INVENTION

This invention is directed to a high solids sodium-silicate water-based paint composition especially useful for providing a dark-colored paint field on soda-lime-silica glass sheets.

BACKGROUND OF THE INVENTION

Various paint compositions are known for use on automotive and architectural glass. Such paints are used, for example, to form opaque borders around the peripheral marginal surfaces of glazings used as windshields, sidelites, and backlites of motor vehicles. These borders are used to obstruct from view attachment means for the glazings and protect adhesives which might be used from exposure to light which could degrade them.

Generally these compositions are ceramic compositions formed from a mixture of metal oxides in an organic (oil based) vehicle like mineral oil. The opaque peripheral marginal paint bands fired onto automotive glazings are generally black provided by colorant oxides like chrome oxide, cobalt oxide and nickel oxide. In view of environmental and commercial considerations, more desirable water-based paints have been developed for use in place of such organic vehicle paints. One such paint is disclosed in U.S. Pat. No. 5,698,026 commonly assigned herewith which advantageously is curable at relatively low temperatures compared to the relatively high temperatures generally required for ceramic/organic vehicle paint curing. Subjecting the glass to high temperatures to cure the paint can impart undesirable optical distortions into the glass sheets. More particularly, the '026 paint is a soda-lime silicate based paint which uses metal oxide pigment to color the glass. One of the drawbacks of the paint is that the color of the water based silicate paint is not as dark as the oil based paint having the same amount of metal oxide pigment. If these two different paints are used in the same automotive vehicle on different glazings, the color should be formulated to appear the same. And merely adding more metal oxide colorant to the water based silicate paint in an attempt to darken the color suitably is not effective to do so. Hence, it is necessary to find another way to darken the color of the silicate paint when desired without negatively affecting the excellent properties of the paint.

It is an object of the present composition to provide a water-based paint composition which is capable of displaying a dark color. It is a further object of the present invention to provide a water-based paint composition which is more opaque to light so as to protect adhesives therefrom. Another object of the present invention is to provide a paint with improved thermal expansion match properties to the glass substrate on which it applied.

These and other objects are accomplished by the present invention paint which is curable at relatively low temperatures and which exhibits excellent durability.

DISCLOSURE OF THE INVENTION

The invention disclosed herein is a high solids water-based paint composition particularly useful as a coating on soda-lime-silica glass. The composition comprises:

(i) water-soluble sodium silicate forming 15 to 30 weight percent of the composition, (ii) water forming 20 to 30 weight percent of the composition;

(iii) water-soluble base in an amount sufficient to provide the composition with a pH of at least about 10.5;

(iv) finely divided metal oxide powder being selected from the group consisting of oxides of copper, iron, nickel, cobalt and mixtures thereof forming 25 to 50 weight percent of the composition and having a particle size less than 7 microns;

(v) glass frit powder melting below 1300° F. and forming 15 to 40 weight percent of the composition and having a particle size, on average, less than 10 microns; optionally, (vi) particles of glass forming 0 to 25% weight percent of the composition and having a diameter, on average, up to 20 microns and comprising soda-lime-silica glass having a melting point of at least about 1700° F.; and (vii) zinc oxide forming 0 to 10 weight percent of said composition.

In addition, preferably the composition comprises small amounts of aluminum hydroxide. The invention, in another aspect, is a preferred process of making the above disclosed water-based paint which comprises combining and mixing the components in two steps. In particular, the metal oxide and low melting are first mixed together with water and the mixture thereof added together with the remaining components to form the paint. According to still another aspect of the invention, it a cured coating of the paint on a glass sheet.

DETAILED DESCRIPTION OF PREFERRED EMBODIMENTS

The invention composition is a water-based paint useful as a coating on glass, such as for the "black out" area around the periphery of a windshield. The glass paint components comprise, as disclosed in detail above, silicate, water, water-soluble base, metal oxide powder like copper oxide, low-melting glass frit powder, and optionally, one or both of high-melting glass particles comprising soda-lime-silica glass and zinc oxide. The components of the composition will be discussed further below. The metal oxide powder, e.g., copper oxide, contributes to give the paint its black to gray color. As pointed out above, it may be desired to make the paint darker to match other paint on the glazings of the vehicle or merely for aesthetic appearance. I unexpectedly found, however, that to make the paint darker black-grey, the addition of more metal oxide powder was not advantageous. Rather, I found that by increasing the amount of low melting glass frit and making thus making the paint more high-solids, the glass was made blacker without the addition of more metal oxide powder. I believe that the reason for this darkening of the paint is that the low melting glass frit wets the metal oxide powder as it melts and which caused the metal oxide powder to appear darker. Neither the truth nor understanding of this theory is necessary for the practice of the invention. It is put forth in an effort to explain the unexpected darkening of the paint color without any additional metal oxide colorant being added.

The low-melting glass frit also serves to improve adhesion to the glass, to PVB which may be used in a windshield laminate, and urethane which is often used to seal and attach the glass in an automotive vehicle. It may further, include zinc oxide to enhance the adhesion of the paint to glass. Each of these components, including optional components, will be discussed in detail below.

Water-soluble sodium silicates form between about 15 and 30 weight percent of the composition of this invention, more preferably, between about 15 and 25 weight percent of the composition, i.e., as used herein "weight percent of the composition" meaning a fraction of the total weight of the composition. They may comprise a single sodium silicate or a mixture of silicates. Water-soluble sodium silicates useful in this invention composition can be represented by the formula $SiO_2:Na_2O$, wherein the mole ratio therein of the two oxides is from about 2:1 to about 4:1. In addition to the water-soluble sodium silicate, water-soluble potassium silicates of similar formula may also be included in the composition. When they are included, they are generally present in minor amounts, preferably less than 5 percent by weight, generally between about 5 and 10 weight percent of the composition.

Yet another required component of the composition is water which is included in an amount between about 20 and 30 weight percent of the total composition weight, preferably in an amount between about 20 and 25 weight percent. The composition also includes a water-soluble base which is employed to provide the paint composition with a pH of at least about 10.5, preferably being above 12.5, more preferably about 13.5. The pH is required to be on the basic side as is indicated by the required pH. Providing the composition with this pH is necessary to impart desirable shelf life to the paint. Embodiments of invention paints with a pH above about 13, for example, have been found to be shelf stable for at least 3 months. Examples of water-soluble bases which may be employed include but are not limited to sodium hydroxide and potassium hydroxide, with sodium hydroxide being preferred. The amount of base employed is dependent, e.g., on the particular base and concentration employed. For example, using a 2N sodium hydroxide base, is generally included in about 2 to 10 weight percent of the composition, more preferably in about 3 to 8 weight percent, and most optimally, in about 3 to 6 weight percent. Optimal amounts and types of bases which may be employed would be apparent to those skilled in the art in view of the present disclosure.

The composition further comprises finely divided metal oxide pigment selected from copper oxide, iron oxide, nickel oxide, cobalt oxide and mixtures thereof, with the inclusion of copper oxide being preferred. This pigment gives the paint a black color and forms 25 to 50 weight percent of the composition, preferably between about 35 to 50 weight percent of the composition. The finely divided powder pigment has a particle size (diameter) on average less than about 7 microns, preferably being between about 3 and 7 microns, most preferably being about 5 microns. These compositions would vary in color from black to dark gray, depending on the mixture and percentages of the metal oxides. Copper oxide, which is preferred, provides a black paint composition. It is undesirable to use chromium oxide in the paint composition since it interferes with the adhesion of the paint to the glass, hence my invention paint is chromium-free.

The paint also includes a glass frit powder which is a low-melting glass material which melts below about 1300° F. Optimally it is included in the water based paint composition in an amount comprising 15–40 weight percent, more preferably being between about 15 and 35 weight percent, most preferably being between about 15 and 30 weight percent of the present invention blackish paint composition. Most preferably, the low-melting glass frit is present in the composition in an amount of about 25 weight percent, based on the total composition weight. The low-melting glass frit is used in a powder form, the particle diameter being on average less than about 10 microns, preferably being between about 3 and 7 microns, most preferably being on average about 7 microns. Exemplary of preferred glass frit materials useful in the present composition, often referred to as enamel frits, are silicates of metals such as zinc, boron, bismuth, titanium, zirconium, and aluminum and mixtures thereof, e.g., titanium-silicate glass, zinc boro-silicate glass and bismuth boro-silicate glass. Many such glass frits are readily commercially available as from General Colors Co. and O. Hommell Co. Still other glass frits which may be employed in the present invention will be apparent to those skilled in the art in view of the present disclosure.

I have found that including this low-melting frit powder in relatively high amounts so as to make a more high solids paint, the paint takes on a darker appearance with the same amount of metal oxide colorant. In addition, the use of this low-melting glass frit in the paint significantly improves its adhesion to the glass on which it is coated and to PVB or urethane sealants which may contact the paint. As is known, PVB is used within laminated windshields and urethane sealants are used between the glass and the car body.

In addition to the above required components, the paint composition optionally includes particles of soda-lime-silica glass which is a high-melting glass frit. This component contributes to improved temperature stability of the paint and adhesion to the glass on which it is applied. The particles are made of any soda-lime-silica glass, this type of glass being well known in the glass industry. Soda-lime-silica glass, used in the automotive and architectural industries, is commonly made by the float glass process. It is generally characterized by the following basic composition, the amounts of the components being based on a weight percentage of the total glass composition: silicon dioxide 68–75; aluminum oxide 0–5; calcium oxide 5–15; magnesium oxide 0–10; sodium oxide 10–18; and potassium oxide 0–5. Additionally, the calcium oxide+magnesium oxide is 6–15%, and sodium oxide+potassium oxide is 10–20%. Such glasses can include colorants like iron oxide, cobalt oxide, or. copper oxide to name a few. Often UV absorbers like titanium oxide or cerium oxide are incorporated to improve the optical properties. Soda-lime-silica glasses, either with or without such colorants or other additives may be used in the present invention paint composition. Desirably, glass particles included in the paint composition would be similar or identical to the glass on which the paint will be applied, however, such is not necessary. The use of a particular soda-lime-silica glass is not critical to the present invention. The glass particles may be in powder or spherical form. Generally, the diameter of the particles is, on average, up to 20 microns, being preferably 3 to 15 microns. More preferably, the particles have a diameter in the range of about 5 to 7 microns.

The soda-lime-silica particles are optionally included in the paint composition in an amount up to 25 weight percent based on total weight of the paint composition. Preferably, when included, the amount of such high-melting glass particles in the water-based paint is up to 20 wt. percent, optimally being up to 10. These particles may be obtained by grinding the glass to a desired diameter or obtained commercially. Spherical particles are most desirable when the paint is to be applied by screen printing, since they are less abrasive to the screen. Spherical particles are commercially available, for example, from Cataphote Inc., under the name Glas-Shot™. In the case of spherical particles the size may be 5 to 20 microns or even smaller since they optimally suitable for use, however smaller sizes are not as readily commercially available.

The chromium-free paint may further include an adhesion promoter: zinc oxide. This adhesion promoter, like the low-melting glass frit, promotes the adhesion of the paint to the glass. And, in addition, when the paint is used in contact with vinyl as in a laminated windshield, these adhesion promoters also promote the adhesion of the vinyl to the glass as described below. When zinc oxide is included in the composition, it comprises generally about up to 10 weight percent, preferably being 2 to 10 weight percent, and more preferably between about 3 and 6 weight percent. Optimally, when included, it comprises between about 4 and 6 weight percent based on the weight of the composition. The zinc oxide is preferred to be provided in the paint composition in a particle size of between about 2 and 3 microns on average, however particle size is not critical. It likewise improves the adhesion to vinyl and urethane sealants.

Still another optional, but desirable, component included in the black paint composition of this invention is a surfactant. Surfactants are well known materials and often added to paints to improve the wetting characteristics of the liquid paint to the substrate to which it is applied. Exemplary of one such material is "FC-171" made by 3M Company. Still other surfactants are known to those skilled in the art. Desirably, it forms about 0.1 to 1.0 weight percent of the paint composition, more preferably about 0.25 to 0.5 weight percent. Another optional but desirable component is aluminum hydroxide which is preferably included in the composition in up to about 5% by weight of the composition. It is generally added to the paint as aluminum hydroxide hydrate and has been found to increase the shelf life of the paint and may increase the adhesion of the paint to the glass sheet.

While this paint composition has particular utility on soda-lime-silica glass as used in automotive and architectural glass, its use is not meant to be so limited. It may also find application for use on other glass like spandrel or on decorative glass panels or even other substrates, other than glass.

To make the paint composition, the components may be added together and then ball milled until a substantially uniform mixture of components is obtained. This milling may also be carried out to provide the desired particle size of the components, for example the glass particles and optional components like the glass frit, if they are initially present in particles sizes which are larger than desired in the final paint. A more preferred method for making the paint compositions involves a two-stage technique. In the first stage, the metal oxide and low-melting glass frit are mixed together and water is added to form a mixture, generally by means of a three-roll mill as is commonly used in the industry to mix such materials. This mixes the materials and breaks up any agglomerates which might form reducing the agglomerates to the particle size of the components before mixing. I believe this mixing with water in this way wets the surface of the powder particles. This mixture is then incorporated with the other components of the paint composition with continued ball milling, this being the second stage of the preferred manufacturing technique. It is believed that because the metal oxide/low-melting glass frit particles have been wet with the water during the first stage, these particles mix readily and with the final components. The paint composition made this way was found to be easily painted onto glass surfaces by conventional techniques such as silk screenings. This mixing is generally carried out at room temperature. The base may be added in the first stage or second stage of paint preparation, the second stage being preferred. The paint exhibits good shelf life. Ideally, however, we prefer to add the metal oxide and the low melting frit mixture to the other components just before the paint is to be used.

After making the subject invention composition, it may be applied to a substrate, particularly a glass substrate in the case of automotive "black-out", by any technique. The glass sheet may be prepared from any type of glass generally known in the art of glass making. Typical glass sheets contemplated for use according to the present invention are soda-lime-silica automotive and architectural glazings, generally produced by the well-known float glass process.

In the application disclosed above, the paint is applied as a uniform layer to a surface of the glass sheet in a predetermined pattern by any paint application method, e.g., screen printing wherein the paint is spread across the screen by a squeegee to force the paint through the pattern onto the glass sheet. It is well known in the painting arts to apply a band of paint to the surface of an automotive glazing by screen printing. In such a situation, it is particularly desirable to maintain a moist environment surrounding the paint during the screening process. optimally the moist environment is maintained about 80+5% rh with the present invention preferred paint compositions. Maintaining this moist environment allows for prolonged use of the paint application screen system by maintaining the moisture content of the paint at a desirable viscosity for application. This environment may be optimally provided, e.g., by the invention described in U.S. Pat. No. 5,509,964 to Boaz and commonly assigned with this invention. It is entitled "Apparatus and Method for Applying a Coating to Glass".

The predetermined pattern in which the paint may be applied to a glass sheet may comprise, for example, an opaque concealment band positioned on a peripheral marginal surface of an automotive glazing. Such concealment bands are well known in the art of automotive glazings as useful for preventing the solar radiation induced degradation of adhesives used to mount the glazings in a vehicle opening, and for concealing attachment hardware and structural components which lie below the edges of the glazings. The band generally extends to the edges of the glazings, and has a width sufficient to conceal the underlying adhesive and structural components, but which is sufficiently narrow to provide maximum vision to occupants of the vehicle. Clearly, other predetermined patterns may be utilized where applying various paint fields to glass surfaces, depending upon the ultimate purpose for the cured paint field.

In the case of coatings applied to automotive glass as "black out", the coating is preferably provided in a thickness of about 12–16 microns. The coating may be applied in any thickness, however, the optimal thickness being determined by the particular application desired.

The curable compositions of the invention, after being applied to a substrate, are readily cured by baking at an elevated temperature for a time sufficient to drive off the water which cures the coating. This step may be carried at any temperature, but desirably at a temperature below the softening point of the glass. Since this water vaporization and curing can be preferably carried out at moderate temperatures, e.g., below about 400° C., even between about 100° C. and 200° C., the painted glass is not subjected to softening and hence is prevented from being distorted during the moderate temperature.

This is in contrast to conventional organic vehicle paints which require being heated to temperatures above the softening point of the glass to cure these paints. Paint compositions applied to glass sheets are generally first cured in order to make the painted glass available for handling for further processing, i.e., bending of the painted glass sheet into a desired final shape. Heating glass to temperatures above the softening point of the glass to cure organic vehicle paints provides the glass with an opportunity to pick up distortions. Subsequent bending of the painted glass, in a second firing, again at these high temperatures provides a second opportunity for distortions to be incorporated into the glass product. Hence, the present invention paint, because it can cure at relatively low temperatures below the softening point of the glass, desirably minimizes the opportunity for distortion to be incorporated into the glass product.

This drying and curing of the water-based black paint composition may be carried out by any means. Two particularly preferred means comprise subjecting the paint applied to the glass to Infra Red (IR) radiation or microwave radiation as in a microwave oven. The latter is most particularly preferred because it may be provided as a compact unit of relatively small size, it consumes less energy and generally requires less maintenance.

In the case of a windshield type 12"×12" sample which had an embodiment of the invention paint composition applied to a portion of its surface as a "black out" band, it was found that the coating could be cured in about one minute at 150° C. in an IR oven or less than about 1 minute in a microwave oven (4 KW power). The particular embodiment of paint composition employed and the area coated suggest the optimal particular parameters useful to cure the invention paint.

As is evident, the present invention moderate temperature curable compositions are of considerable advantage in that they provide for significant energy savings in comparison to compositions which require significantly elevated temperatures for curing. In addition, as discussed above, when the substrate is glass, optical distortions can be incorporated into the glass sheet when it is exposed to significantly elevated temperatures as required to cure conventional organic vehicle glass coatings. The present invention composition overcomes this disadvantage of prior art coatings which require elevated temperatures for curing the paint. While, as described above, the paint finds particular usefulness on glass, it may also be used to paint other substrates, including, e.g., metal or plastic.

Generally, coated automotive glass will subsequently be subjected to shaping which involves subjecting the glass to high temperatures of the order of 1150° F. or more, which can be 1250° F. or more if the glass is tempered. This will allow the coating to further cure, although such is not required to provide a durable and adherent coating on a substrate.

The following examples are presented by way of description of the invention and to set forth the best mode contemplated by the inventor, but are not to be construed as limiting.

Examples

The following three examples are embodiments of paint compositions made according to the present invention. All component amounts are in weight percent of the total paint composition.

| Paint # | 1 | 2 | 3 |
|---|---|---|---|
| Sodium Silicate | 15 | 17 | 20 |

-continued

| Paint # | 1 | 2 | 3 |
|---|---|---|---|
| Ground Glass (Soda lime glass 7 micron diameter) | 0 | 2.9 | 0 |
| Potassium Silicate | 0 | 1.0 | 1.0 |
| Water | 20 | 20 | 20 |
| Sodium Hydroxide (50% solution) | 2 | 3.0 | 3.9 |
| Copper Oxide | 35.9 | 35 | 40 |
| Zinc Oxide | 0 | 1.0 | 0 |
| Glass Frit (bismuth borosilicate) | 27 | 20 | 15 |
| Surfactant (FC-171, 3M Company) | 0.1 | 0.1 | 0.1 |

The black paint compositions above were applied by screen printing to glass (soda-lime-silica) sheets to a thickness of 16 microns and cured in an IR over for 3 minutes at 120° C.

The black cured paint displayed uniform coating and excellent adherence to the glass as was shown by subjecting the painted glass to a hot water bath for 5 days at 60° C. whereby the paint showed no delamination.

Color Comparision Test

The surface of a glass panel is painted and the paint fully cured by passing it through an oven which heats the glass to over 550° C.

Four other paint compositions were made as follows:

| | Paint No. | | | |
|---|---|---|---|---|
| | #4 | #5 | #6 | #7 |
| Sodium Silicate | 15 | 16 | 15 | 18 |
| Soda-Lime-Silica Glass | 0 | 0 | 0 | 0 |
| Potassium Silicate | 1.8 | 1.8 | 2.0 | 2.0 |
| Water | 20.0 | 20.0 | 20.0 | 20.0 |
| Copper Oxide | 31.0 | 28.0 | 50.0 | 48.8 |
| Glass Frit (bismuth borosilicate) | 25 | 30 | 5.0 | 5.0 |
| Zinc Oxide | 3.0 | 2.0 | 3.8 | 2.0 |
| Aluminum Hydroxide | 2.0 | 0.0 | 2.0 | 2.0 |
| Sodium Hydroxide (50%) | 2.0 | 2.0 | 2.0 | 2.0 |
| Surfactant (FC-171, 3M Company) (The glass powder has a 7 micron average diameter) | 0.2 | 0.2 | 0.2 | 0.2 |

The two paint compositions according to embodiments of the present invention (#4 and #5) and two comparative paint (#6 and #7), not according to the present invention, were evaluated visually for color in comparison to normal oil based paint color. Paints (#4 and #5) obtained a dark black color comparable to the color of an oil based paint while paints (#6 and #7) obtained a flat gray-black color not comparable to the same oil based paint. Inclusion of higher levels of copper oxide colorant in (#6 and #7)did not darken the paint to be comparable to the oil based paint.

I claim:

1. A dark colored water-based paint composition, which has excellent adhesion to glass, comprising:

(i) water-soluble sodium silicate forming 15 to 30 weight percent of said composition, (ii) water forming 20 to 30 weight percent of said composition;

(iii) water-soluble base in an amount sufficient to provide said composition with a pH of at least 10.5;

(iv) finely divided metal oxide powder selected from the group consisting of oxides of copper, iron, nickel, cobalt and mixtures thereof forming 25 to 50 weight percent of said composition and having a particle size, on average, less than 7 microns;

(v) low-melting glass frit powder melting below 1300° F. forming about 25 to 40 weight percent of said composition and having a particle size, on average, less than 10 microns;

(vi) particles of soda-lime-silica glass forming 0 to 25 weight percent of the composition and having a diameter, on average, less than 20 microns and having a melting point of at least about 1700° F.; and (vii) zinc oxide forming 0 to 10 weight percent of said composition.

2. The water-based paint composition according to claim 1 wherein said soda-lime-silica particles are composed of, by weight percent, silicon dioxide 68–75; aluminum oxide 0–5; calcium oxide 5–15; magnesium oxide 0–10; sodium oxide 10–18; and potassium oxide 0–5, wherein the calcium oxide+magnesium oxide is 6–15% and sodium oxide+potassium oxide is 10–20% by weight.

3. The water-based paint composition according to claim 1 wherein said composition further comprises potassium silicate.

4. The water-based paint composition according to claim 1 wherein said composition further comprises 0.1 to 1.0 weight percent surfactant.

5. The water-based paint composition according to claim 1 which further comprises up to about 5 weight percent of aluminum hydroxide.

6. The water-based paint composition according to claim 1 wherein said low-melting glass frit is selected from a metal silicate wherein said metal is selected from the group consisting of zinc, boron, bismuth, titanium zirconium, and aluminum and mixtures thereof.

7. A water-based paint composition, which has excellent adhesion to glass, comprising:

(i) water-soluble sodium silicate forming 15 to 30 weight percent of said composition, (ii) water forming 20 to 30 weight percent of said composition;

(iii) water-soluble base in an amount sufficient to provide said composition with a pH of at least 10.5;

(iv) finely divided copper oxide powder forming 35 to 50 weight percent of said composition and having a particle size on average between 3 and 7 microns;

(v) glass frit powder, having a melting point below 1300° F., forming about 25 to 40 weight percent of said composition and having a particle diameter, on average, between about 3 and 7 microns and wherein said glass frit is a metal silicate with said metal being selected from the group consisting of zinc, boron, bismuth, titanium zirconium, and aluminum and mixtures thereof;

(vi) particles of soda-lime-silica glass forming 0 to 10 weight percent of the composition and having a diameter, on average, in the range of 5 to 20 microns and having a melting point of at least about 1700° F. and being composed of, by weight percent, silicon dioxide 68–75; aluminum oxide 0–5; calcium oxide 5–15; magnesium oxide 0–10; sodium oxide 10–18; and potassium oxide 0–5, wherein the calcium oxide+magnesium oxide is 6–15% and sodium oxide+potassium oxide is 10–20% by weight; and (vii) surfactant forming 0.1 to 1.0 weight percent of said composition.

8. The paint composition according to claim 7 wherein said composition further comprises aluminum hydroxide.

9. A method of making a water based paint composition whose components comprise:

(i) water-soluble sodium silicate forming 15 to 30 weight percent of said composition, (ii) water forming 20 to 30 weight percent of said composition;

(iii) water-soluble base in an amount sufficient to provide said composition with a pH of at least 10.5;

(iv) finely divided metal oxide powder selected from the group consisting of oxides of copper, iron, nickel, cobalt and mixtures thereof forming 25 to 50 weight percent of said composition and having a particle size, on average, less than 7 microns;

(v) low-melting glass frit powder melting below 1300° F. forming about 25 to 40 weight percent of said composition and having a particle size, on average, less than 10 microns;

(vi) particles of soda-lime-silica glass forming up to 0 to 25 weight percent of the composition and having a diameter, on average, less than 20 microns and having a melting point of at least about 1700° F.; and (vii) zinc oxide forming 0 to 10 weight percent of said composition, said method comprising the steps:

mixing said metal oxide powder and said low-melting glass frit powder with water and ball-milling to form a mixture; and mixing said ball-milled mixture with the remaining components to form said paint composition.

10. The method according to claim 9 wherein said metal oxide powder and said low-melting glass frit powder are mixed with said water in a ratio of about 1:1 by volume.

11. A glazing carrying on at least a portion thereof a paint composition comprising:

(i) water-soluble sodium silicate forming 15 to 30 weight percent of said composition, (ii) water forming 20 to 30 weight percent of said composition;

(iii) water-soluble base in an amount sufficient to provide said composition with a pH of at least 10.5;

(iv) finely divided metal oxide powder selected from the group consisting of oxides of copper, iron, nickel, cobalt and mixtures thereof forming 25 to 50 weight percent of said composition and having a particle size, on average, less than 7 microns;

(v) low-melting glass frit powder melting below 1300° F. forming about 25 to 40 weight percent of said composition and having a particle size, on average, less than 10 microns; and, (vi) particles of soda-lime-silica glass forming 0 to 25 weight percent of the composition and having a diameter, on average, less than 20 microns and having a melting point of at least about 1700° F.; and (vii) zinc oxide forming 0 to 10 weight percent of said composition.

12. The glazing according to claim 11 wherein said low-melting glass frit is selected from a metal silicate wherein said metal is selected from the group consisting of zinc, boron, bismuth, titanium zirconium, and aluminum and mixtures thereof.

13. A glass substrate carrying on at least a portion thereof a cured coating of a dark colored water-based paint composition which has excellent adhesion to said glass, said composition comprising:

(i) water-soluble sodium silicate forming 15 to 30 weight percent of said composition;

(ii) water forming 20 to 30 weight percent of said composition;

(iii) water-soluble base in an amount sufficient to provide said composition with a pH of at least 10.5;

(iv) finely divided metal oxide powder selected from the group consisting of oxides of copper, iron, nickel, cobalt and mixtures thereof forming 25 to 50 weight percent of said composition and having a particle size, on average, less than 7 microns;

(v) low-melting glass frit powder melting below 1300° F. forming about 25 to 40 weight percent of said composition and having a particle size, on average, less than 10 microns;

(vi) particles of soda-lime-silica glass forming 0 to 25 weight percent of said composition and having a diameter, on average, less than 20 microns and having a melting point of at least about 1700° F.; and (vii) zinc oxide forming 0 to 10 weight percent of said composition.

\* \* \* \* \*